Aug. 5, 1958
L. H. PELC
2,845,897
CATTLE RUBBING AND OILING DEVICE
Filed Aug. 23, 1954
2 Sheets-Sheet 1
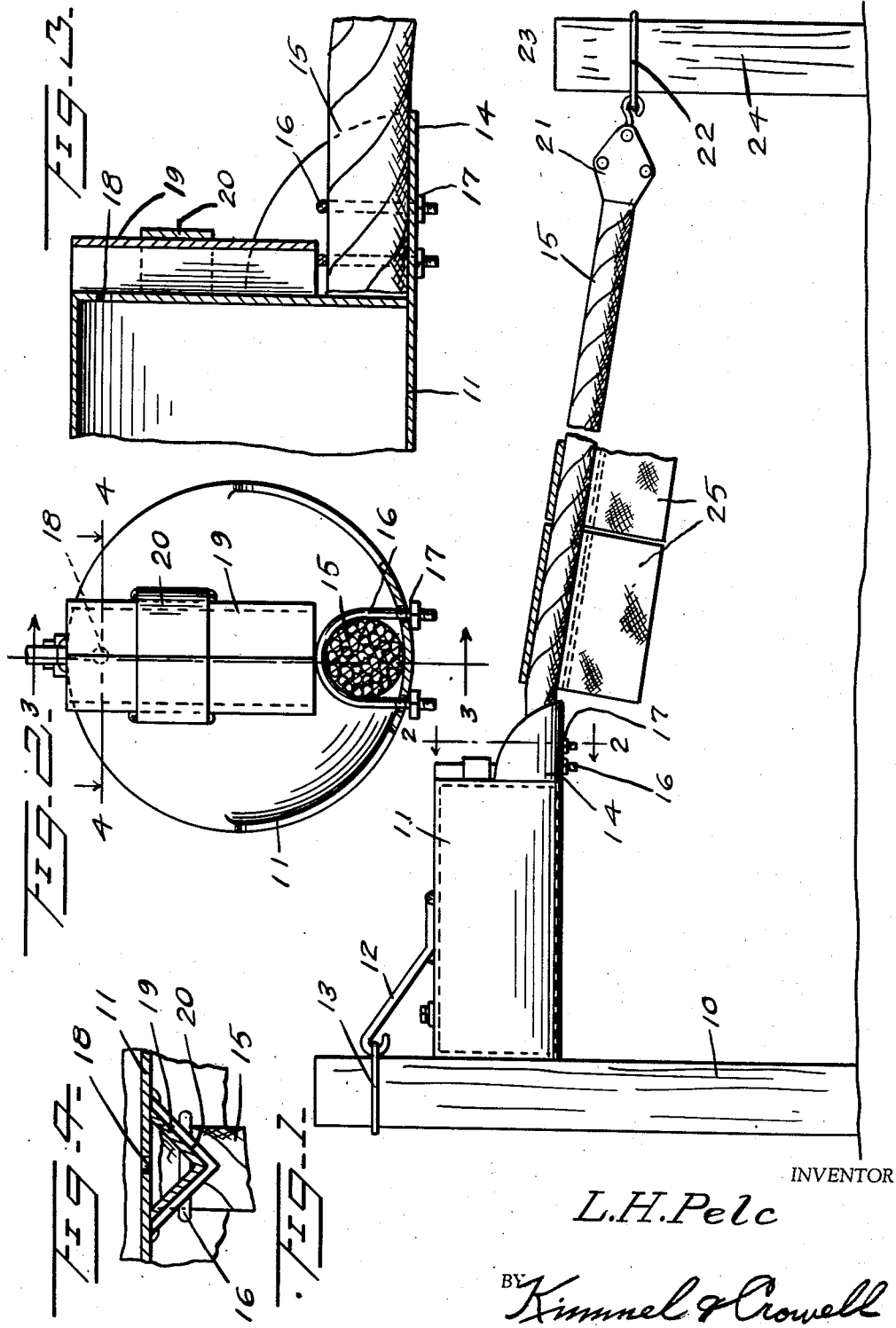
INVENTOR
L. H. Pelc
BY Kimmel & Crowell
ATTORNEYS Aug. 5, 1958
L. H. PELC
2,845,897
CATTLE RUBBING AND OILING DEVICE
Filed Aug. 23, 1954
2 Sheets-Sheet 2
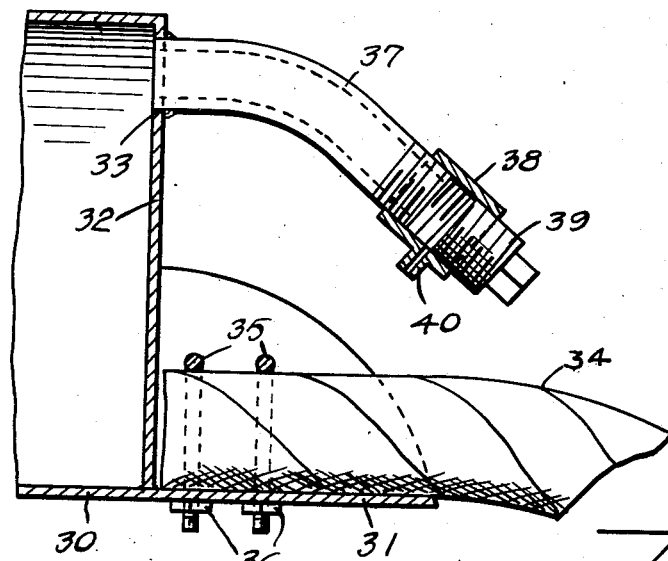
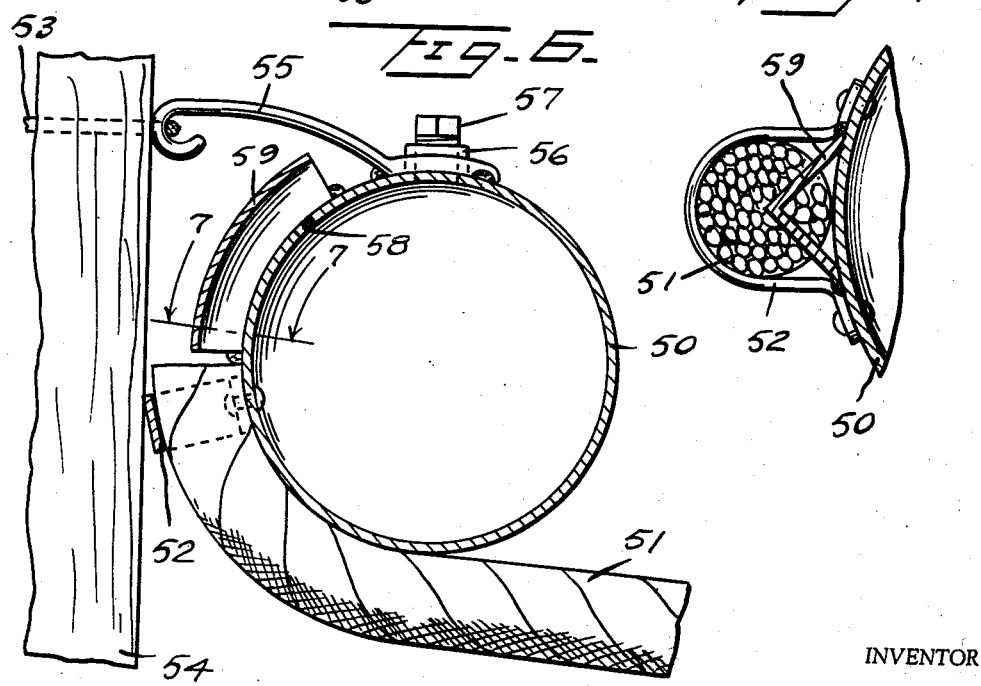
INVENTOR
L. H. Pelc
BY Kimmel & Crowell
ATTORNEYS

United States Patent Office 2,845,897
Patented Aug. 5, 1958

2,845,897

CATTLE RUBBING AND OILING DEVICE

Leonard H. Pelc, Johnstown, Nebr.

Application August 23, 1954, Serial No. 451,380

3 Claims. (Cl. 119—157)

This invention relates to a cattle rubbing and oiling device.

An object of this invention is to provide a device adapted to be secured between a pair of posts which includes means for rubbing the backs of cattle and simultaneously applying an oil or insecticide to the backs.

Another object of this invention is to provide a back rubbing means in the form of an elongated piece of rope with a fluid reservoir connected to one end of the rope and including means for automatically maintaining the rope substantially saturated with the liquid so that when the cattle contact the rope, the liquid saturating the rope will rub onto the backs of the cattle.

A further object of this invention is to provide a back rubbing means embodying a fibrous rope having means at one end for securing the rope to an upstanding post, with a reservoir secured to the other end of the rope and having a hook to engage a second post. The reservoir is formed with an opening whereby agitation of the housing by cattle rubbing on the rope will splash the liquid in the reservoir and a small amount of liquid will pass out of the discharge opening and flow through a guide onto the rope. In this manner the rope will not be excessively saturated with the liquid and the liquid will not drop down onto the ground.

Still other objects will in part be obvious and in part be pointed out as the description of the invention proceeds and as shown in the accompanying drawing, wherein there is disclosed a preferred embodiment of this inventive concept.

In the drawings:

Figure 1 is a side elevational view of the device of the instant invention, parts thereof being broken away;

Figure 2 is an enlarged sectional view taken substantially along the line 2—2 of Figure 1 as viewed in the direction indicated by the arrows;

Figure 3 is a sectional view taken substantially along the line 3—3 of Figure 2, as viewed in the direction indicated by the arrows;

Figure 4 is a sectional view taken substantially along the line 4—4 of Figure 3;

Figure 5 is an enlarged sectional view showing a modified form of construction;

Figure 6 is a sectional view of a still further modified form of the invention; and Figure 7 is a sectional view taken substantially along the line 7—7 of Figure 6.

Similar reference characters refer to similar parts throughout the several views of the drawing.

Referring now to the modification disclosed in Figures 1 to 4, inclusive, there is shown at 10 a post to which is semi-rigidly attached a fluid reservoir 11. The reservoir 11 is cylindrical in cross section and includes at its top an offset hook-shaped member 12 adapted to engage a ring 13 or the like surrounding the upper end of the post. The forward end of the reservoir is provided with a lip 14, to which is secured one end of a rope 15, which comprises the rubbing element of this invention. The securing means preferably takes the form of U-shaped staples 16, having threaded extremities to which are secured nuts 17 for clamping the rope 15 to the lip 14.

The front end of the reservoir 11 is closed and provided with an aperture 18 from which oil or the like is supplied to a V-shaped vertical feeder trough 19, secured in place by a band 20 engaged with the front of the reservoir. The feeder trough 19 stops directly above the secured end of the rope 16, and fluid from the feeder trough is thus fed directly to the rope end, and by capillary action permeates the entire length of the rope.

The opposite end of the rope 15 is provided with a clamp 21 carrying a hook 22, which is adapted to engage a band 23 surrounding a second post 24.

If desired, the rope may be supplied with fly sheets 25 made of canvas, burlap, or the like.

In the operation of the device, as a steer or other animal rubs against the rope 15 and/or the fly sheets 25, the reservoir 11 is vibrated, causing a splashing of the liquid, and a portion of the liquid passes through the aperture 18 into the feeder trough 19 and is thence conveyed to the end of rope 15 and thence through the length of the rope. Although the reservoir 11 has one end secured to the post 10, it, nevertheless, will be agitated enough to cause some of the contents of the reservoir to spill through the opening 18 as the rope is rubbed by an animal engaging it. Note that a bracket 12 which helps to support the reservoir is loosely hooked to a band 13 on the post but this will permit sufficient side movement of the reservoir to agitate and splash the liquid in the reservoir.

In the modification disclosed in Figure 5, there is provided a tank 30 having an extending lip 31, and a front wall 32 provided with an aperture 33 at its upper portion. A rope 34 is secured to lip 31 by means of brackets 35 and clamping nuts 36. In this modification, the aperture 33 communicates with one end of a pipe 37, the other end of which is threaded to receive an internally threaded nipple 38 having an adjustable plug 39 threaded into its outer end. The plug 39 is provided, intermediate its ends, with a nozzle 40 positioned over the rope 34. The plug 39 is adapted for adjustment whereby the flow of fluid through the nozzle 39 may be controlled.

In the modification of Figures 6 and 7, there is shown a cylindrical tank 50, which has the end of a rope 51 secured to the side thereof as by a clamping brakcet 52. The reservoir 50 is secured to a band 53 secured about a post 54 by means of a hook member 55 secured to the top of the receptacle. A filling opening 56 having a closure 57 is provided in the top of the receptacle 50. A relatively small aperture 58 is provided in the side of receptacle or reservoir 50, and positioned under an arcuate guide or feeder channel 59, which is triangular in cross section, and which guides fluid splashed through the aperture 58, when the receptacle is vibrated, as described in connection with previous modifications, to the end of rope 51.

From the foregoing, it will now be seen that there is herein provided a cattle rubbing and oiling device which accomplishes all the objects of this invention, and others, including many advantages of great practical utility and commercial importance.

As many embodiments may be made of this inventive concept, and as many modifications may be made in the embodiments hereinbefore shown and described, it is to be understood that all matter herein is to be interpreted merely as illustrative and not in a limiting sense.

What is claimed is:

1. A livestock oiling apparatus comprising a pair of spaced apart supports, a liquid reservoir, an elongated hook fixed to said reservoir and semi-rigidly engaged with one of said supports, an elongated fibrous rope, means securing one end of said rope to the other of said supports, clamping means on the lower portion of said reservoir securing the other end of said rope to said reservoir, said reservoir having a liquid dispensing opening therein above the normal level of liquid in the reservoir, and a liquid confining guide element fixed to said reservoir adjacent said liquid dispensing opening and overlying said rope to guide liquid dispensed from said opening onto said rope, vibratory movement of said reservoir caused by livestock rubbing against said rope intermediate the ends thereof effecting splashing of the liquid through said dispensing opening and thus onto said rope.

2. A device as claimed in claim 1 wherein said liquid confining guide comprises a pipe having one end fixed to said reservoir with the dispensing opening therein communicating with said pipe, said pipe having the opposite end thereof overlying said rope.

3. A device as claimed in claim 1 wherein said liquid confining guide comprises a V-shaped trough fixed to said reservoir in vertically extending relation with the upper end portion of said trough aligned with the opening in said reservoir, said trough having the opposite end thereof overlying said rope.

References Cited in the file of this patent
UNITED STATES PATENTS

| | | |
|---|---|---|
| 2,438,731 | Wedeking | Mar. 30, 1948 |
| 2,632,063 | Peterson | Mar. 17, 1953 |
| 2,663,284 | Stonesifer | Dec. 22, 1953 |
| 2,669,968 | Rasmussen | Feb. 23, 1954 |
| 2,678,632 | Brown | May 18, 1954 |
| 2,702,020 | Worden | Feb. 15, 1955 |
| 2,711,721 | Gray | June 28, 1955 |